United States Patent [19]

Willett

[11] Patent Number: 5,021,635

[45] Date of Patent: Jun. 4, 1991

[54] BAKER'S OVEN

[76] Inventor: John A. Willett, 2 Brewer Street, Clontarf, Queensland, 4019, Australia

[21] Appl. No.: 420,939

[22] Filed: Oct. 13, 1989

[51] Int. Cl.⁵ .............................................. A21B 1/00
[52] U.S. Cl. .................................... 219/408; 219/402; 219/404; 219/409; 219/410
[58] Field of Search ............... 219/408, 406, 407, 405, 219/403, 404, 402, 410

[56] References Cited

U.S. PATENT DOCUMENTS 2,415,768  2/1947  Shaw ................................... 219/402
3,731,039  1/1973  Beech .................................. 219/407

FOREIGN PATENT DOCUMENTS

2850/46  11/1946  Australia .

Primary Examiner—Bruce A. Reynolds
Assistant Examiner—Tuan V. To
Attorney, Agent, or Firm—William H. Eilberg

[57] ABSTRACT

An electrically-heated deck type baker's oven where the electric heating elements, which are U-shaped in plan view, are supported by and slidable through metal chairs in rectangular metal tubes forming a series of lower and upper passages lining the top and bottom of the oven compartment.

3 Claims, 2 Drawing Sheets

BAKER'S OVEN

BACKGROUND OF THE INVENTION

1. Field of the Invention

This invention relates to a baker's oven.

2. Prior Art

Difficulty has been experienced in producing a satisfactory electrically-heated deck-type baker's oven, as the electric heating elements are apt to create "hot spots" resulting in uneven application of heat to the bakery products and generally unsatisfactory baking. This disadvantage may be overcome by providing rotary supports for the bakery products which therefore are continually moved in relation to the heating elements. However, a rotary oven of this type is likely to have a lesser capacity than an equivalent deck-type oven, and to be of more costly construction and operation.

SUMMARY OF THE INVENTION

The present invention has been devised with the general object of providing a deck-type oven which is electrically heated and which is particularly efficient in operation. Ovens according to the invention may be of large capacity in relation to their overall dimensions, and to be simple and economical to manufacture and to operate.

With the foregoing and other objects in view, the invention resides broadly in a baker's oven of the type having a generally rectangular baking compartment accessible by way of a loading door wherein the heating means for the oven include a series of lower and upper passages, preferably parallel metal tubes of rectangular cross-section, lining the bottom and top respectively of the oven compartment and electrically heating elements enclosed within the passages and spaced from the walls thereof.

Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein.

DETAILED DESCRIPTION OF THE PREFERRED EMBODIMENTS

Figure 1:
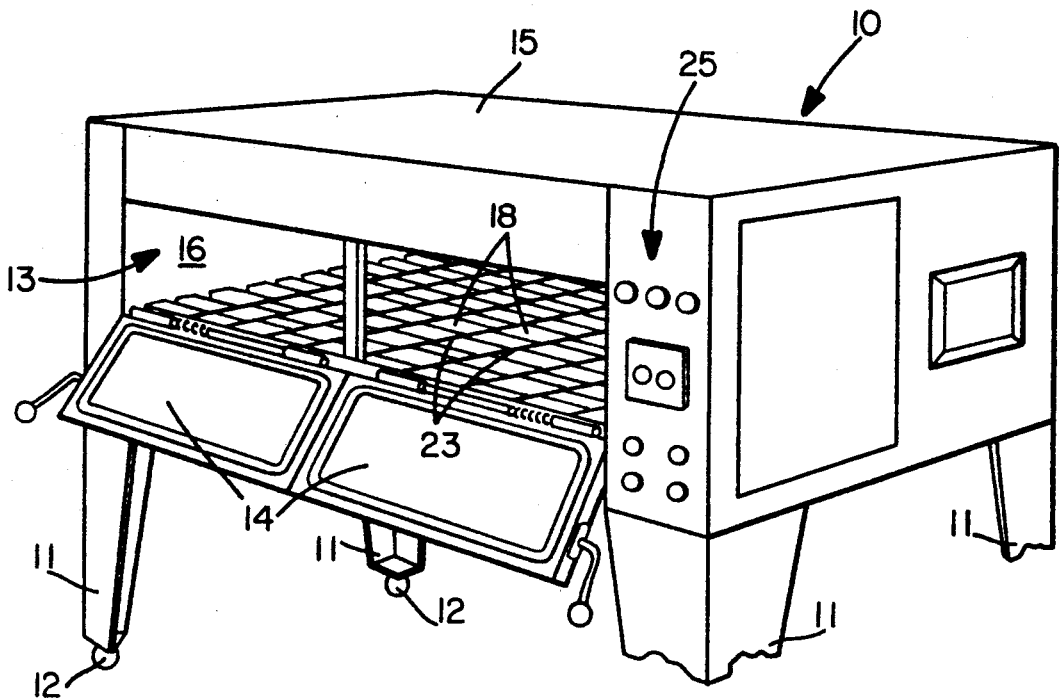
FIG. 1 is a partly broken-away perspective view of a single-deck oven according to the invention.
Figure 2:
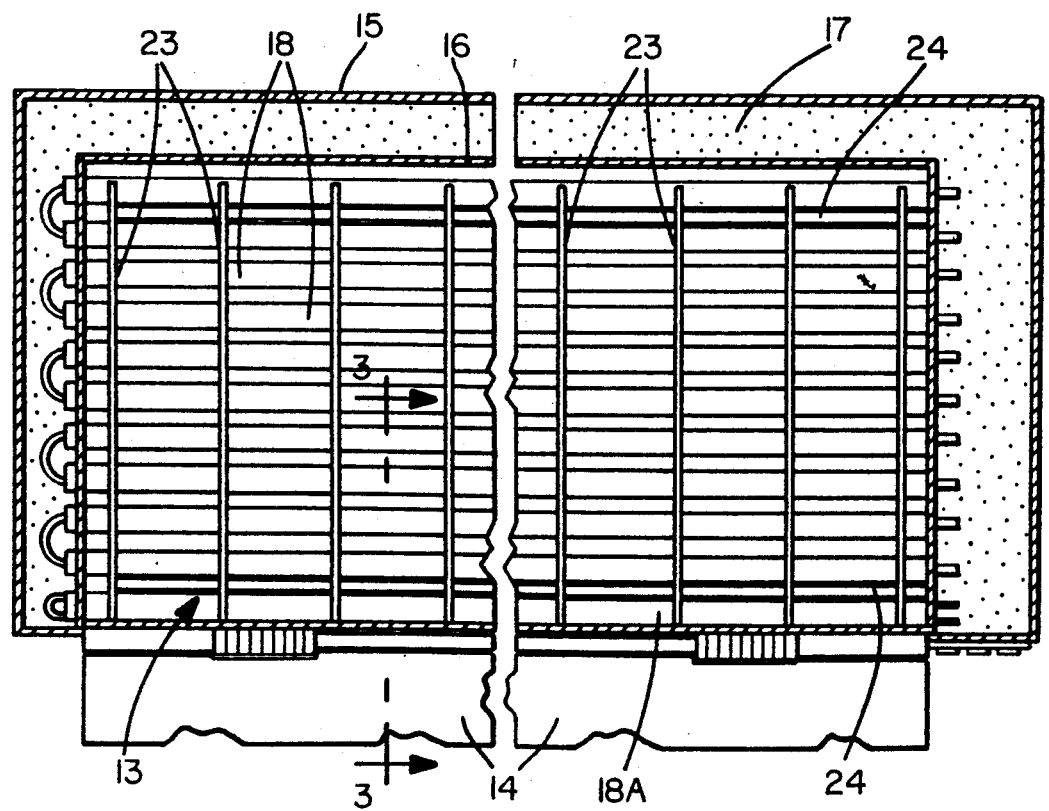
FIG. 2 is a partly broken-away horizontal sectional view of the oven.
Figure 3:
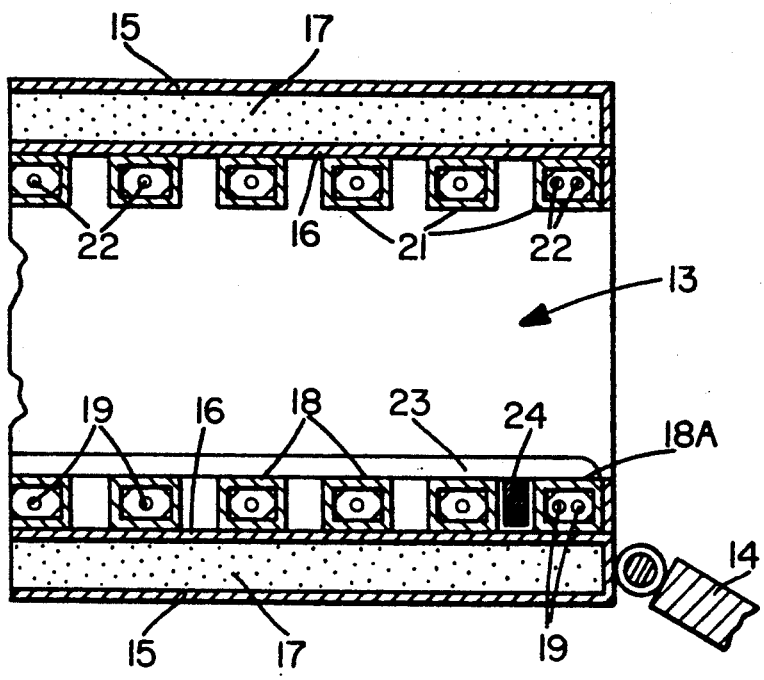
FIG. 3 is a sectional view of part of the oven taken along line 3—3 in FIG. 2.

The baker's oven shown in the drawings has a baking compartment 10 of rectangular box-like form mounted on legs 11 with castor wheels 12, the horizontally elongated loading opening 13 at the front of the compartment being capable of being closed by a pair of hinged and spring-loaded doors 14. The compartment consists mainly of an outer casing 15 of sheet metal, and a sheet metal box-like liner 16 fixed within and spaced from the outer casing 15, heat insulating material 17 being interposed between the two.

Extending from side to side on the bottom of the liner 16 are a number of similar spaced parallel lower heating tubes 18, each of rectangular cross-section, and each passing closely through rectangular holes in the sides of the liner, the tube being welded to one side of the liner but, to allow for expansion, being slidable through its hole in the other side.

Figure 4:
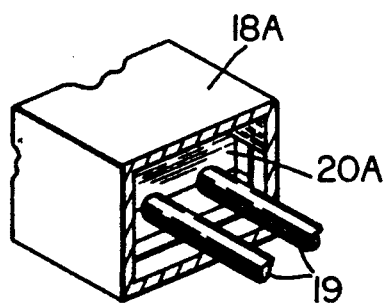
FIGS. 4 and 5 are perspective detail drawings of parts of heating tubes of the oven.
Figure 5:
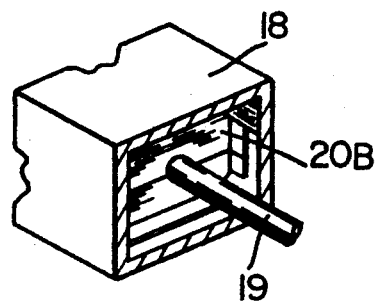

Each of the heating tubes encloses a rod-type electric heating element 19. In the heating tube 18a across the front of the bottom of the oven the heating element is doubled, with a close U-bend at its middle. Each of the remaining heating tubes encloses half of a heating element rod which, at its middle, is formed with a wider U-bend so that one arm extends through one of the heating tubes, the other arm passing through the next succeeding heating tube. Each heating element is supported within the tube by simple chairs as shown in FIGS. 4 and 5, the chairs 20a in the front heating tube 18a being formed with two apertures to accept both arms of the doubled over element 19, the chairs 20b in each of the remaining heating tubes 18 supporting a single arm of a doubled-over element. Each chair comprises two metal plates with matching semi-circular recesses to receive the heating element arm or arms, the two parts being then welded together. The corners of each chair are cut away to form air passages.

Below the top of the oven liner 16 there is installed a series of upper heating tubes 21 enclosing electric heating elements 22, this upper assembly being similar in all material respects to the lower heating assembly.

An assembly of slide rails 23 is removably supported by the lower heating tubes 18, these rails extending from front to back in spaced parallel arrangement, and being interconnected by transverse bars 24, each of which seats between a pair of heating tubes 18. The slide rails facilitate the introduction and withdrawal of baking trays (not shown) for carrying bakery products.

The several controls for the heating of the lower and upper heating tubes are installed at a control panel 25 at the front of the oven.

In the operation of the oven, the electric heating elements radiate heat to the heating tubes within which they are enclosed, and so the heat emitted from the fairly small-area elements is diffused, being radiated to bakery products from the considerably greater areas of the tubes. The front heating tubes of the lower and upper assemblies receive greater heat than the remaining tubes to compensate for heat losses when the oven doors are opened.

The heating tubes may be subject to a wide range of modifications. For example, they may be closely adjacent if preferred, and/or their cross-sectional configuration may be altered in any of a number of ways to achieve optimum results. Instead of being of rectangular cross-section they may be of segmental shape with arcuately curved upper surfaces (in the lower assembly) which may be blackened for high emissivity, their flat lower surfaces being polished for low emissivity. Again, the tubes may be extruded with heat-radiating longitudinal projections or fins. An oven according to the invention may, of course, be of multi-deck type, and in such a case the upper heating tubes of a lower deck may serve also as the lower heating tubes of an upper deck. The foregoing and many other modifications of constructional detail and design, which will be readily apparent to persons skilled in the art are considered to lie within the scope and ambit of the invention hereinafter claimed.

I claim:

1. A baker's oven of the type having a generally rectangular baking compartment accessible by way of a loading door, wherein the heating means for the oven include:
- a series of lower and upper passages lining the bottom and top, respectively, of the oven compartment; and
- electric heating elements enclosed within the passages and spaced from the walls thereof.
- wherein the lower passages and the upper passages in each case consist of a series of parallel rectangular metal tubes, and
- wherein the electric heating elements are supported by and slidable through metal chairs in the rectangular metal tubes.

2. A baker's oven of the type having a generally rectangular baking compartment accessible by way of a loading door, wherein the heating means for the oven include:
- a series of lower and upper passages lining the bottom and top, respectively, of the oven compartment; and
- electric heating elements enclosed within the passages and spaced from the walls thereof,
- wherein each of the electric heating elements is formed with a median U-bend so as to have two parallel arms,
- wherein the upper passage and the lower passage nearest the loading door each encloses the two arms of a heating element, and
- wherein each of the other passages encloses a single arm of a heating element.

3. A baker's oven of the type having a generally rectangular baking compartment accessible by way of a loading door, wherein the heating means for the oven include:
- a series of lower and upper passages lining the bottom and top, respectively, of the oven compartment; and
- electric heating elements enclosed within the passages and spaced from the walls thereof,
- wherein lower passages and the upper passages in each case consist of a series of parallel rectangular metal tubes,
- wherein each of the metal tubes at one end extends through and is fixed in an aperture in one side wall of the oven compartment, its other end extending closely but slidably through an aperture on the other side wall of the oven compartment, and
- wherein the electric heating elements are supported by and slidable through metal chairs in the rectangular metal tubes.

* * * * *